(12) United States Patent
Rybakken

(10) Patent No.: US 12,536,514 B2
(45) Date of Patent: Jan. 27, 2026

(54) TRANSACTION METHOD FOR A ZK-ROLLUP NETWORK FOR A BLOCKCHAIN

(71) Applicant: Ryodan Systems AG, Lucerne (CH)

(72) Inventor: Erik Rybakken, Drammen (NO)

(73) Assignee: Ryodan Systems AG, Luzem (CH)

( * ) Notice: Subject to any disclaimer, the term of this patent is extended or adjusted under 35 U.S.C. 154(b) by 0 days.

(21) Appl. No.: 18/664,188

(22) Filed: May 14, 2024

(65) Prior Publication Data

US 2024/0386404 A1  Nov. 21, 2024

(30) Foreign Application Priority Data

May 15, 2023  (EP) ..................................... 23173367

(51) Int. Cl.
*G06Q 20/10* (2012.01)
*G06Q 20/38* (2012.01)

(52) U.S. Cl.
CPC ......... *G06Q 20/10* (2013.01); *G06Q 20/3825* (2013.01); *G06Q 20/389* (2013.01); *G06Q 2220/00* (2013.01)

(58) Field of Classification Search
CPC .. G06Q 20/10; G06Q 20/3825; G06Q 20/389; G06Q 2220/00
USPC .......................................................... 705/39
See application file for complete search history.

(56) References Cited

U.S. PATENT DOCUMENTS

| | | | |
|---|---|---|---|
| 12,210,513 B1* | 1/2025 | Obstfeld | G06F 16/2365 |
| 2019/0295049 A1* | 9/2019 | Karame | G06Q 20/3678 |
| 2020/0126075 A1* | 4/2020 | Fisch | G06F 21/6245 |
| 2020/0328893 A1* | 10/2020 | Westland | H04L 63/123 |

(Continued)

FOREIGN PATENT DOCUMENTS

CN  114 298 842 A  4/2022

OTHER PUBLICATIONS

Garoffolo et al: "Zendoo: a zk-SNARK Verifiable Cross-Chain Transfer Protocol Enabling Decoupled and Decentralized Sidechains", arxiv.org, Cornell University Library, Feb. 5, 2020, 40 pages.

(Continued)

*Primary Examiner* — Gregory S Cunningham, II
*Assistant Examiner* — Michael J Warden
(74) *Attorney, Agent, or Firm* — Fleit Intellectual Property Law; Paul D. Bianco; Jon Gibbons

(57) ABSTRACT

A computer-implemented transaction method for a ZK-rollup network for a blockchain, with transaction rules governed by a ZK-rollup smart contract deployed on the blockchain, and with the ZK-rollup network comprising several user ZK-rollup nodes of which at least one is an aggregator ZK-rollup node. The method includes using the ZK-rollup smart contract to process a valid user transfer by computing a history root hash from content of the aggregator transfer transaction and from an immediately preceding history root hash, and storing the computed history root hash in a ZK-rollup contract state; and processing a withdrawal of funds to one or more blockchain addresses by receiving an aggregator withdrawal transaction from an aggregator ZK-rollup node, verifying the aggregator withdrawal transaction, and transferring funds according to the purported total amounts received and according to total amounts already withdrawn.

20 Claims, 5 Drawing Sheets

(56) References Cited

U.S. PATENT DOCUMENTS

| | | | | |
|---|---|---|---|---|
| 2020/0379977 | A1* | 12/2020 | Saket | H04L 9/3218 |
| 2022/0076334 | A1* | 3/2022 | Filter | G06Q 30/0185 |
| 2022/0392176 | A1* | 12/2022 | Malik | G06F 16/40 |
| 2023/0153905 | A1* | 5/2023 | Sanchez | G06Q 40/04 |
| | | | | 705/37 |
| 2023/0281583 | A1* | 9/2023 | Jakobsson | H04L 67/1097 |
| 2023/0315817 | A1* | 10/2023 | Yallen | G06F 21/10 |
| | | | | 345/473 |
| 2023/0401226 | A1* | 12/2023 | Garoffolo | H04L 9/50 |
| 2024/0257110 | A1* | 8/2024 | Deible | G06Q 20/36 |
| 2024/0289793 | A1* | 8/2024 | Jentzsch | G06Q 20/02 |
| 2024/0330935 | A1* | 10/2024 | Abdelrahman | G06Q 20/381 |
| 2024/0333741 | A1* | 10/2024 | Abdelrahman | G06Q 20/382 |
| 2025/0158839 | A1* | 5/2025 | Burns | H04L 9/3236 |

OTHER PUBLICATIONS

Rosca et al: "Security of Ethereum Layer 2s", IACR, International Association for Cryptologic Research, Feb. 2, 2023, 10 pages.
Tran An Cong et al, "An Implementation and Evaluation of Layer 2 for Ethereum with zk-Rollup", Advances in Visual Computing : 16th International Symposium, Oct. 4-6, 2021, 9 pages.
European Search Report dated Oct. 13, 2023 for European Patent Application No. 23173367.6.

\* cited by examiner

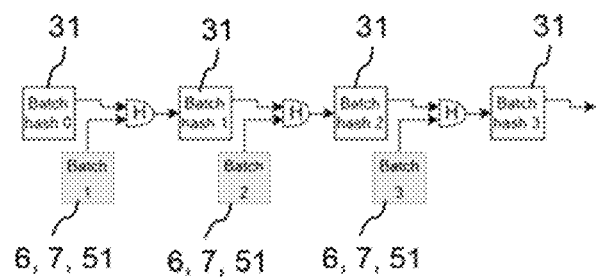
Fig. 1
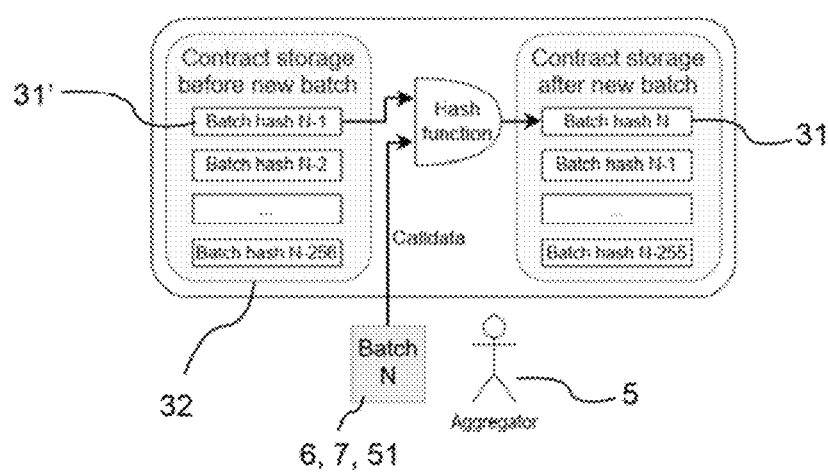
Fig. 2
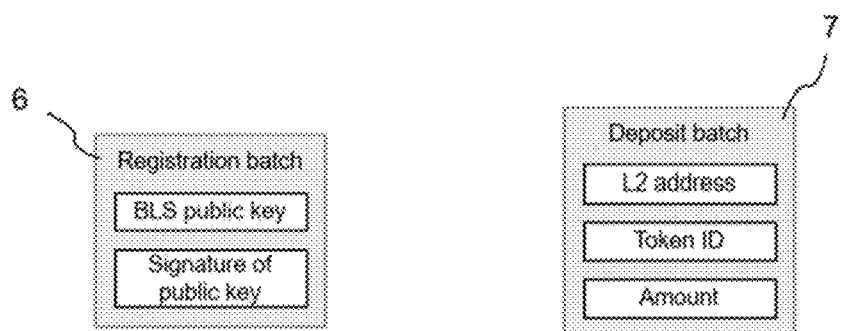
Fig. 3
Fig. 4

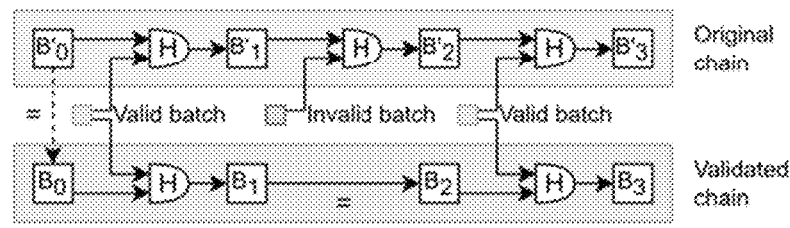
Fig. 6
Fig. 7
Fig. 8
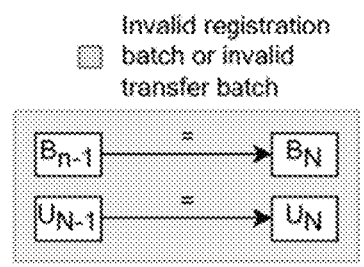
Fig. 9

TRANSACTION METHOD FOR A ZK-ROLLUP NETWORK FOR A BLOCKCHAIN

TECHNICAL FIELD

The invention relates to a computer-implemented transaction method for a zero knowledge-rollup (called ZK-rollup) network for a blockchain, where the transaction rules are governed by a ZK-rollup smart contract deposited on the blockchain.

TECHNICAL BACKGROUND

In the context of blockchains so-called on-chain computations and on-chain data storage, i.e., computations executed and data stored on the blockchain itself, are expensive and often also constitute a technical bottleneck. Therefore, so-called layer 2 solutions like zero knowledge-rollups (called ZK-rollups) bundle, or roll up, transactions into batches that are executed off-chain. Off-chain computation reduces the amount of data that has to be posted to the blockchain. ZK-rollup operators submit a summary of the changes required to represent all the transactions in a batch rather than sending each transaction individually. They also produce validity proofs to prove the correctness of their changes. Such validity proofs demonstrate with cryptographic certainty that the proposed changes to the blockchain's state are truly the end-result of executing all the transactions in the batch. In the case of ZK-rollups, the validity proofs involve techniques known from zero knowledge-proofs (or ZK-proofs for short).

Even though on-chain computation and on-chain data storage is reduced by the employment of any ZK-rollup, the way transactions are processed by means of a ZK-rollup is diverse and highly influences the benefit in terms of costs it can provide.

With most existing ZK-rollups, the transaction data needs to be posted on-chain for each transaction, where the transaction data includes the transaction sender, token index, amount, and recipient. This was improved with Springrollup, which is a ZK-rollup where a sender can batch an arbitrary number of transfers to other accounts while only having to post their address as calldata, i.e., data submitted from the rollup to the blockchain, in addition to some small constant sized data for each block. Each sender can send as many transactions as he wants in a block, without additional on-chain data cost. This provides a reduction of on-chain data compared to previous solutions. As a by-product, increased privacy is achieved since less user data is posted on-chain.

The technique employed with Springrollup was further improved with Intmax, by a combination of client-side ZK-proofs and limited online assumptions. Hereby the former contributes to the reduction of aggregator costs by outsourcing parts of the zero knowledge-verification process to the users. Those have to generate ZK-proofs and post them to an aggregator which then aggregates the user transactions and sends an aggregated batch of transactions on-chain to complete transactions.

Another challenge in the context of ZK-rollups concerns decentralized aggregators, aggregating transactions from users allowing for compressed data and decreased computational resource needs. This challenge is how to ensure liveliness without having to trust the aggregators. For Intmax, if one naively allows for multiple aggregators, each aggregator must provide a piece of data (the updated user states) to the next aggregator for them to be able to make a new block. This approach has two disadvantages: Firstly, since each aggregator needs to build upon the previous block, this method requires the complexity of a leader selection method to determine which aggregator can create a new block. Secondly, and more importantly, the ZK-rollup will halt if one of the aggregators fails to provide the data to the next aggregator, and all users would need to exit the rollup.

SUMMARY OF THE INVENTION

One aspect of the invention relates to a transaction method for a ZK-rollup for a blockchain which solves at least one of the problems of prior art.

A blockchain is understood here to be a smart contract-compatible blockchain, for example Ethereum.

Disclosed herein are embodiments of a transaction method for a ZK-rollup for a blockchain.

The transaction method for a ZK-rollup network for a blockchain, with transaction rules governed by a ZK-rollup smart contract deployed on the blockchain, and with the ZK-rollup network comprising several user ZK-rollup nodes of which at least one is an aggregator ZK-rollup node, comprising the following steps: by means of the ZK-rollup smart contract, processing a user transfer by a) receiving an aggregator transfer transaction from an aggregator ZK-rollup node A of the at least one aggregator ZK-rollup node, with the aggregator transfer transaction being generated at the aggregator ZK-rollup node A and comprising
  i. a Merkle root of a Merkle tree of at least one user transfer instruction, with each of the at least one user transfer instruction being generated at one of the several user ZK-rollup nodes and transferred to the aggregator ZK-rollup node A,
  ii. an aggregated signature built from at least one user signature of the Merkle root, with each of the at least one user signature of the Merkle root corresponding to a user ZK-rollup account and being transferred to the aggregator ZK-rollup node A from one of the several user ZK-rollup nodes after the latter has received the Merkle root together with a proof of inclusion of the user transfer instruction generated at this user ZK-rollup node from the aggregator ZK-rollup node A, and
  iii. a list of every user ZK-rollup account corresponding to any of the at least one user signature of the Merkle root from which the aggregated signature is built;
b) verifying that the aggregator transfer transaction is formally valid; and
c) if the verification in the previous step was successful, without further verification computing a history root hash from content of the aggregator transfer transaction and from an immediately preceding history root hash, and storing the computed history root hash in a ZK-rollup contract state until a predefined condition is met;
and processing a withdrawal of funds to one or more blockchain addresses by d) receiving an aggregator withdrawal transaction from an aggregator ZK-rollup node B of the at least one aggregator ZK-rollup node, with the aggregator withdrawal transaction being generated at the aggregator ZK-rollup node B and comprising
  i. the one or more blockchain addresses,
  ii. a history root hash M, iii. a purported total amount received by each of the one or more blockchain addresses at history root hash M,
iv. one or more recursive ZK-proofs of the correctness of each purported total amount received;

e) verifying
i. that the aggregator withdrawal transaction it is formally valid,
ii. that the history root hash M is stored in the ZK-rollup contract state, and
iii. each of the one or more recursive ZK-proofs of the correctness of each purported total amount received;

f) if the verifications in the previous step were successful,
i. transferring funds according to the purported total amount received by each of the one or more blockchain addresses at history root hash M and according to total amounts already withdrawn to each of the one or more blockchain addresses,
ii. updating a list of total amounts already withdrawn to each of the one or more blockchain addresses according to the amounts processed for each of the one or more blockchain addresses in step i., wherein the list of total amounts withdrawn to each of the one or more blockchain addresses is stored in the ZK-rollup contract state.

Note that the aggregator ZK-rollup node A and the aggregator ZK-rollup node B may be the same aggregator ZK-rollup node.

The aggregator transfer transactions can come in the form of a ZK-rollup block which is added by the corresponding node to the ZK-rollup chain by making a blockchain transaction with the content of the respective transaction as calldata, or blob-data, to the ZK-rollup smart contract. Aggregator withdrawal transactions can be implemented via a withdrawal function of the ZK-rollup smart contract.

This transaction method presented here is based on the Intmax design and improves existing solutions in two ways:

Firstly, many independent trustless aggregators working in parallel are enabled, which increases availability and censorship-resistance. Block production can happen without needing to know the previous blocks at all.

Secondly, the finalization time for transactions is decreased, which is the time between a user initiating a payment and the same user receiving a guarantee that the payment has succeeded and cannot be reverted.

These improvements moreover come together with decreased resource requirements of so-called on-chain computations and on-chain data storage, i.e., computations executed and data stored on the blockchain itself. In the context of blockchains such on-chain computations and on-chain data storage are expensive and also constitute a technical bottleneck. The reason for this is that a blockchain is a public database that is updated and shared across two or more nodes in a network. Hence storing data on-chain means to store data on every node. Moreover, since blockchains usually work with a consensus method, on-chain computations suggested by one node usually need to be verified by other nodes. Consequently, the amount of on-chain data storage and on-chain computations are highly relevant for the determination of the hardware requirements to be met by a node in order to be able to participate in the blockchain.

The costs of adding a ZK-rollup block to the ZK-rollup chain, and therefore of ZK-rollup transactions, are moreover dominated by the fees required to post the block to the blockchain. For instance, in Ethereum or similar blockchains, users need to pay fees when sending a transaction to the blockchain. These fees are determined by the amount of resources the transaction uses. These resources can be categorized into three categories; computational resources, which are needed when verifying a ZK-proof, bandwidth resources, which is the data that is sent to the blockchain, and storage, which is the data stored in the ZK-rollup smart contract's storage. ZK-rollups use mainly computational resources for verifying ZK-proofs, and bandwidth resources for making transaction data available, while storage is sparsely used by ZK-rollups, and is only used for storing e.g., state or history hashes. Note here the difference between storage and bandwidth: Storage is used when storing data permanently on the blockchain in the ZK-rollup smart contract's storage, while bandwidth is for data that is not stored and can be pruned by blockchain nodes. Bandwidth is cheap compared to storage. Since computation is fixed and independent of the number of transactions in a ZK-rollup block, as a ZK-proof can prove an arbitrary number of transactions without increasing the verification costs of the proof, the main bottleneck of ZK-rollups is the bandwidth consumption which is proportional to either the number of transactions in a ZK-rollup block, as it is the case in existing ZK-rollups, or the number of senders in the block, as it is the case in the present protocol. In this regard, the present design is more data-efficient than existing ZK-rollups since it requires only the posting of the sender address for each sender in the block, while other ZK-rollups need to post both the sender address and the other transaction details such as token ID, amount, and recipient address. This makes the present design more efficient than existing ZK-rollups. The present design is also more computationally efficient compared to existing ZK-rollups. In fact, by doing on-chain verification of ZK-proofs only when withdrawing, the withdrawal operations can be performed at a lower frequency compared to adding new ZK-rollup blocks. In this way, the fast finalization time can be kept by having frequent ZK-rollup blocks, while the on-chain computation costs are kept low by having less frequent withdrawals. For instance, if one ZK-rollup block is added in every blockchain block, and a withdrawal operation is performed on average every 100 blockchain blocks, then the present design is approximately 100 times more efficient with regards to on-chain computation than a ZK-rollup which verifies every ZK-rollup block as it is added.

The strategy of the present transaction method is in part enabled by the use of recursive ZK-proofs, which allows to bundle and postpone verifications needed to guarantee safety.

As it is usually the case, the way transactions are processed by means of the ZK-rollup is governed by transaction rules implemented by the ZK-rollup smart contract deployed on the blockchain. A ZK-rollup smart contract is a program which is deployable on the blockchain by addition of a compatible block, comprising the ZK-rollup smart contract program, to the blockchain. The ZK-rollup smart contract program comprises at least one function and a ZK-rollup state, where the at least one function is callable by blocks added to the blockchain after the deployment of the ZK-rollup smart contract and where the ZK-rollup state is a data set which can be transformable by calling the at least one function, or by calling a subset or all of the at least one function if there are more than one, and by blocks added to the blockchain and/or the ZK-rollup chain after the deployment of the ZK-rollup smart contract.

Here by running a node of the blockchain on a computer device it is understood that a client is run on this computer device, where this client is a software which downloads a copy of the blockchain and verifies the validity of every block, then keeps it up-to-date with new blocks and transactions, and helps others download and update their own copies. User ZK-rollup nodes, and therefore also aggregator ZK-rollup nodes, are nodes of the blockchain.

A user is understood here as a user operator having access to a user ZK-rollup node on a computer device. The user operator can be one or more natural persons or a software.

An aggregator is understood here as an aggregator operator having access to an aggregator ZK-rollup node on a computer device. The aggregator operator can be one or more natural persons or a software. It is understood here that a user ZK-rollup node is also an aggregator ZK-rollup node if this user ZK-rollup node interacts with the on-chain ZK-rollup smart contract by sending aggregator transfer transactions and/or aggregator withdrawal transactions to it.

Having access to a node means here to run the node or accessing it via a computer device and a user interface provided by a trusted third-party such as Infura® (Consensys Software Inc., Fort Worth, TX).

Every user and every aggregator of the ZK-rollup must be able to access the blockchain. There are several ways to access the blockchain, including running a blockchain node or by using a trusted third-party node such as Infura. Every blockchain node needs to process the transactions to the ZK-rollup smart contract, as well as all the other transactions happening on the blockchain, but does not necessarily need to participate in the ZK-rollup in other ways.

In order to make a transaction, a user can send a user transfer instruction to one of the aggregators. Note that it can be provided that the user may send different user transfer instructions to different aggregators. An aggregator then bundles a set of received user transfer instructions and builds a Merkle tree from them. Then the aggregator sends the Merkle root of the just built Merkle tree to each of the users which contributed a user transfer instruction to the Merkle tree, together with a proof of inclusion of the user transfer instruction of that specific user. Upon reception of the Merkle root and the proof of inclusion of his user transfer instruction in the corresponding Merkle tree, the user may sign the Merkle root and send the signature back to the aggregator. The aggregator can then gather the signatures corresponding to the Merkle root until he has received them all, or preferably up to some specific time limit. Subsequently, the aggregator can generate an aggregated signature from the received user signatures and send this aggregated signature, together with the corresponding Merkle root and a list of the users which contributed a signature to the aggregated signature, to the ZK-rollup smart contract. This is done by adding a block to the ZK-rollup chain which calls the ZK-rollup smart contract.

By calling the ZK-rollup smart contract it is understood here that a function of the smart contract is called and the ZK-rollup state is altered.

Note that the at least one user transfer instruction can include user transfer instructions generated at the user ZK-rollup node being the aggregator ZK-rollup node A itself. Furthermore, the aggregator transfer transaction can contain only such a user transfer instruction generated at the aggregator ZK-rollup node A itself. It is however advantageous in terms of costs and resources if several user transfer transactions are batched together in an aggregator transfer instruction instead of every user just sending its own transactions, since this way data can be compressed more efficiently.

The communication between an aggregator ZK-rollup node and user ZK-rollup nodes is typically realised by the user ZK-rollup node communicating with one or more servers owned by the corresponding aggregator using an existing data communication protocol such as JSON-RPC or similar.

A user transfer instruction from a user can contain instructions for at least one transfer of funds from a ZK-rollup address assigned to a user ZK-rollup account of this user to another ZK-rollup address or to a blockchain address. All transfers contained in a single user transfer instruction have to have the same sending ZK-rollup address but can have different receiving addresses, where each receiving address can be either some ZK-rollup address or some blockchain address.

Blockchain addresses are on the level of the blockchain itself, whereas ZK-rollup addresses are on the level of the ZK-rollup.

A transfer of funds between blockchain and/or ZK-rollup addresses refers to the change of assignment of the funds from one address to another address.

Funds are here any kind of assets that are supported by the underlying blockchain. Such assets are typically sets of tokens. A token is understood here as a digital token, such as a non-fungible token (NFT), ERC-20, or some unit of a native cryptocurrency.

A Merkle tree is a tree in the computer science sense in which every tree node which is a leaf is labelled with the cryptographic hash of a data block, and every tree node that is not a leaf is labelled with the cryptographic hash of the labels of its child tree nodes.

A proof of inclusion in the context of a Merkle tree is also called a Merkle proof and consists of the siblings of the leaf whose inclusion is to be proofed and each intermediate hash needed to calculate the root hash, i.e., the hashes of the intermediate nodes and their siblings.

The user signature of the Merkle root can be generated at the user ZK-rollup node transferring it to the aggregator ZK-rollup node A, or by means of a separate software, possibly on a separate computer device, and then transferred to the user ZK-rollup node for further transfer to the aggregator ZK-rollup node A. For the latter option, the separate software can have received the Merkle root and the inclusion proof from the user ZK-rollup node before generating the signature.

Note that there needs not to be a user signature of the Merkle root for every user transfer instruction. If there is no user signature, the corresponding user transfer instruction can be kept in the aggregator transfer transaction but cannot be validly referred to by a recursive ZK-proof.

The list of user ZK-rollup accounts can comprise for example user identifiers assigned to the user accounts, which can for example be BLS public keys or shorter identifiers assigned to the users at the time of a user registration.

When the ZK-rollup smart contract receives a batch of transactions from an aggregator, i.e., when a block is added to the ZK-rollup chain by an aggregator which calls the smart contract, the ZK-rollup smart contract accepts the batch of transactions if it is formally valid. The batch of transactions is formally valid if the corresponding block and the instructions are in the intended format. In particular, the ZK-rollup smart contract does not verify any content of the batch of transactions. If the batch of transactions is formally valid, the smart contract computes a history root hash using a hash function which has as input at least the last history root hash which has been computed before and either all or only part of the content the batch of transactions. The ZK-rollup smart contract then stores the computed history root hash in the ZK-rollup state until the predefined condition is met. Therefore, after the current history root hash is stored in the ZK-rollup state, it stays there until the predefined condition is met, and after that it is automatically deleted from the ZK-rollup state.

The output of a hash function is called hash or hash value and hashing X is understood here as to compute a hash function with input comprising X.

The first history root hash can take as input either all or parts of the content of the corresponding transaction and a predefined input as replacement of the previous history root hash.

Without further verification means that the validity of the content of the aggregator transfer transaction is not verified. For example, the validity of signatures is not verified.

Computing a history root hash from X means here that one computes the output of some hash function with the input X. Note that here either all or only part of the content of the aggregator transfer transaction can be contained in the input of the hash function.

Note that since each user has received an inclusion proof of their transaction in the aggregator transfer transaction, there is no need to publish the transactions themselves on-chain, just the transaction Merkle tree root. This makes the present method more data-efficient than other ZK-rollup transaction methods where all transaction data is published on-chain.

Note also that an aggregator does not need to know the previously processed transactions in order to add a new transaction to the rollup. This means aggregating is fully permissionless, so that new transactions can be added concurrently by anyone.

If a user wants to withdraw funds to a blockchain address, he can initiate the corresponding transactions as described above. Subsequently, any aggregator can pick a history root hash M which has been stored after or in the process of the addition of the block containing the last transaction to be taken into account. The aggregator who picked the history root hash M can then for a set of blockchain addresses generate a recursive ZK-proof that a given total amount received by one of the blockchain address at history root hash M is correct himself, and/or gathers such proofs from other users. The recursive ZK-proof can be a cryptographic proof that the blockchain address has received at least the purported total amount at the point when history root hash M was computed, which contains information on every relevant transaction. The aggregator can then send the recursive ZK-proofs together with the purported total amounts received, the history root hash M and the corresponding blockchain addresses in an aggregator withdrawal transaction to the ZK-rollup smart contract. The ZK-rollup smart contract upon reception of the aggregator withdrawal transaction verifies that the latter is formally valid, i.e., has the intended format, that the history root hash M is stored in the ZK-rollup contract state, and each recursive ZK-proof. If all verifications by the ZK-rollup smart contract are successful, the ZK-rollup smart contract transfers funds according to the purported total amounts received by the blockchain addresses and according to total amounts already withdrawn to each of the concerned blockchain addresses, where the latter are stored in the ZK-rollup contract state, updated with every withdrawal, and set to some predefined initial value, e.g. 0, if no withdrawal to the corresponding blockchain address has been processed yet. The transferring can be done by transferring the assets to the blockchain address which belong to it according to the aggregator withdrawal transaction and have not been withdrawn and therefore transferred before according to the total amount withdrawn to the blockchain address stored in the ZK-rollup contract state. Eventually the ZK-rollup smart contract replaces the total amount withdrawn to the blockchain address stored in the ZK-rollup contract state before the present withdrawal with the updated total amount withdrawn to the blockchain address after the present withdrawal. More concretely, the ZK-rollup smart contract can comprise a withdraw function, which can be called by any aggregator, takes the content of the aggregator withdrawal transaction as an input, performs the verifications, and if the verifications are successful, performs the transferring of funds and updates the total amount withdrawn.

Here the M in history root hash M can be just some label or a count of every history root hash computed.

Note that naturally an aggregator withdrawal transaction comprising a history root hash M has to be generated by the aggregator ZK-rollup node B after the history root hash M has been computed and stored in the ZK-rollup contract state.

The purported total amount received by a blockchain address can for example be a list of the amounts of assets of each kind received by this address.

The total amount withdrawn to a blockchain address can be a list of total amounts of each kind of asset withdrawn to the blockchain address. The total amount withdrawn to a blockchain address before any withdrawal to that blockchain address can be set to a default value or index, e.g. the value 0.

The total amount withdrawn to each blockchain address is stored and updated in the ZK-rollup contract state. Transferring funds according to an aggregator withdrawal transaction and according to the total amounts already withdrawn to one of the involved blockchain addresses means that the data of the transaction as well as of the total amounts withdrawn is considered and the actual transfer amount is possibly calculated from amounts indicated by this data.

The recursive ZK-proofs can be kept as a set of recursive ZK-proofs for each purported total amount received, or they can be summarized to a combined recursive ZK-proof for all purported total amounts received. In the former case, each recursive ZK-proof can be generated at one of the several user ZK-rollup nodes and then be transferred to the aggregator ZK-rollup node B, or it can be generated at a separate software and then be provided to one of the several user ZK-rollup nodes from which it is then transferred to the aggregator ZK-rollup node B. In the latter case, the combined recursive ZK-proof for all purported total amounts received can be generated at the aggregator ZK-rollup node B, for example by generating an aggregated ZK-proof from recursive ZK-proofs for each purported total amount received, where the latter proofs can be provided in the same way as in the former case.

The present ZK-rollup design differs from other designs in the way that states are handled. Instead of having a global state of user balances, each user maintains and updates a recursive ZK-proof of the balance of the ZK-rollup addresses and blockchain addresses that are owned by this user. For each new ZK-rollup block, respectively each transaction processed by the smart contract, each user can update its balance and compute a new recursive ZK-proof of the balance of its addresses.

The requirements for the recursive ZK-proof to be formally valid depend on the corresponding ZK proof system.

The balance recursive ZK-proofs can be based on Plonky2 and/or Nova and/or SuperNova.

Note that the point in time when the ZK-rollup blocks corresponding to the transactions referred to by the balance recursive ZK-proof were added is only relevant in the sense that this has to be before or during history root hash M was stored. Since every history root hash is computed from the previous one, transactions can be verified even if the corresponding blocks were added long before.

The security assumptions on the protocol presented here are the same as the assumptions for the underlying blockchain, together with the assumption that the employed ZK proof system is secure.

In some embodiments the transaction method may comprise the following additional step: by means of the ZK-rollup smart contract:

processing a registration of a user ZK-rollup account by
a) receiving a user registration transaction from one of the several user ZK-rollup nodes, with the user registration transaction comprising a user identifier of the user ZK-rollup account and a user signature of the user identifier,
b) verifying the user signature of the user identifier, and
c) if the verification in the previous step was successful,
  (i) computing a history root hash (31) from content of the user registration transaction and the immediately preceding history root hash (31'), and storing the computed history root hash (31) in the ZK-rollup contract state (32) until the predefined condition is met, and (ii) assigning a ZK-rollup address to the user ZK-rollup account.

Note that there can be user ZK-rollup nodes by means of which several user ZK-rollup accounts are registered, or a single one, or none. A user can register a user ZK-rollup account with one user ZK-rollup node and afterwards participate in the ZK-rollup also or exclusively with other user ZK-rollup nodes.

Blockchain addresses to which funds can be withdrawn can correspond to smart contract accounts or externally owned accounts (EOAs).

In some embodiments user signatures and/or aggregated signatures may be BLS signatures.

A Boneh-Lynn-Shacham (BLS) signature is a cryptographic signature scheme which allows a user to verify that a signer is authentic. The scheme involves a private key and a corresponding public key. Under the scheme, a user can generate a user signature of a bitstring by computing a given function from the bitstring and the private key. A verifier subsequently can verify the signature given the signature and the public key. Multiple BLS signatures, corresponding to multiple private keys and/or multiple bitstrings, can be aggregated into a single BLS signature.

When using BLS signatures, the user identifier and the user signature of the user identifier contained in the user registration transaction can be a public BLS key and a signature computed from the public BLS key together with the corresponding private BLS key.

In some embodiments the transaction method may comprise the following additional step: by means of the ZK-rollup smart contract:
processing a user token deposit by
a) receiving a set of tokens together with a user token deposit transaction from one of the several user ZK-rollup nodes, with the user token deposit transaction being generated at this user ZK-rollup node and comprising
  i. at least one token ID,
  ii. an amount of tokens for each of the at least one token IDs, and
  iii. a ZK-rollup address to receive the amounts of tokens;
b) verifying that
  i. the user token deposit transaction is formally valid, and
  ii. for each of the at least one token IDs, the set of tokens received comprises as many tokens corresponding to this token ID as indicated by the amount of tokens for this token ID;
c) if the verifications in the previous step were successful, computing a history root hash from content of the user token deposit transaction and the immediately preceding history root hash, and storing the computed history root hash in the ZK-rollup contract state until the predefined condition is met.

A user token deposit transaction is formally valid if it is in the intended format.

Computing a history root hash from X means here that one computes the output of some hash function with the input X. Note that here either all or only part of the content of the user deposit transaction can be contained in the input of the hash function.

Note that the user registration transactions, the user token deposit transactions, and the aggregator transfer transactions can each come in the form of a ZK-rollup block which is added by the corresponding node to the ZK-rollup chain by making a blockchain transaction with the content of the respective transaction as calldata, or blob-data, to the ZK-rollup smart contract.

A token ID is understood here as an identifier of a specific class of tokens, i.e., of the kind of token, like for example a kind of cryptocurrency, like ETH, DAI, or USDC, or a specific NFT. The token IDs can for example be natural numbers.

In addition to the ZK-rollup chain on the blockchain, there can be a corresponding validated ZK-rollup chain computed off-chain. Here we call a ZK-rollup block corresponding to an aggregator transfer transaction valid if the latter is formally valid and its aggregated signature is correct with respect to its list of user ZK-rollup accounts. Otherwise, the ZK-rollup block corresponding to an aggregator transfer transaction is called invalid. Furthermore, we call a ZK-rollup block corresponding to a user registration transaction valid if the latter is formally valid and the user signature of the user identifier is correct with respect to the user identifier. User token deposit transactions are always considered valid, as their content is verified by the ZK-rollup smart contract when they are added. The validated ZK-rollup chain is then computed by only including validated ZK-rollup blocks and skipping invalid ones. More precisely, whereas the original history root hashes of the original ZK-rollup chain are computed from the previous original history root hash and the content of the current ZK-rollup block, no matter whether the current ZK-rollup block is valid, the same is done for the validated ZK-rollup chain but only if the current ZK-rollup block is valid. Hence, in order to update the validated ZK-rollup chain, the validity of the newly added ZK-rollup blocks to the original ZK-rollup chain have to be verified beforehand. This verification, which involves the verification of signatures corresponding to user ZK-rollup accounts respectively user identifiers, can be done by keeping track of user ZK-rollup accounts and their corresponding ZK-rollup addresses in an off-chain user ZK-rollup state. When a ZK-rollup block is verified, a proof of the validity of this ZK-rollup block can be generated and posted on-chain. Note that the computations and proofs for the validated ZK-rollup chain can be performed by any user participating in the ZK-rollup, i.e., having registered at least one user ZK-rollup account. Moreover, users participating in the ZK-rollup can store their own version of the validated chain without making computations by trusting in the validity proofs of the ZK-rollup blocks being posted on-chain. In order to incentivize e.g., aggregators to take care of the task of verifying ZK-rollup blocks and generating proofs and posting the proofs on-chain, there can be suitable rules incorporated in the ZK-rollup smart contract. Similarly, suitable rules can help to motivate trusting in posted validity proofs of ZK-rollup blocks without them having to be verified on-chain in most cases.

If a validated ZK-rollup chain is available (in the sense of validity proofs of ZK-rollup blocks being posted on-chain), a balance recursive ZK-proof of a user withdrawal instruction can take as public input the original history root hash M, the one or more blockchain addresses, and their claimed balance at original history root hash M, and prove 1) that there exists a validated history root hash M' and a recursive ZK-proof that this is the correct validated history root hash corresponding to the original history root hash M, and 2) that for each of the one or more blockchain addresses, there exists a recursive ZK-proof that this blockchain address has the specified balance at validated history root hash M'.

More generally, the proof system can be any proof system capable of making recursive ZK-proofs.

In some embodiments the predefined condition may be either that a fixed number x of succeeding history root hashes is stored, or the predefined condition is that another history root hash corresponding to the same blockchain block and/or a fixed number x of succeeding history root hashes is stored.

Here the fixed number x is a natural number bigger than or equal to 1.

For both options, at most x+1 history root hashes are kept in the storage. As there can be several ZK-rollup blocks contained in one blockchain block, i.e., in one blockchain transaction, the two options may however differ. The second option can be realised by storing the blockchain block number in which the last ZK-rollup block was added in the ZK-rollup contract state.

Note that here it is possible that the history root hash to be erased from the storage is done so by overwriting it with the xth succeeding history root hash or with the other history root hash corresponding to the same blockchain block respectively. In that case, deleting the old history root hash and storing the xth succeeding history root hash or the other history root hash corresponding to the same blockchain block respectively are happening simultaneously. This also means that in this case, there are at most x history root hashes in the storage at the same time.

In some embodiments the fixed number x may be a natural number between 1 and $2^{16}$, and preferably $2^7 <= x <= 2^9$, and most preferably $x=2^8$.

Note that in principle, x could be any natural number>0. There is however a trade-off: on the one hand, if the number is too small, there might not be enough time to generate the balance recursive ZK-proofs needed for withdrawing before the history root hash is deleted from the ZK-rollup contract state. On the other hand, if the number is too big, there is more data that needs to be stored by the ZK-rollup smart contract.

If the predefined condition is that another history root hash corresponding to the same blockchain block and/or a fixed number x of succeeding history root hashes is stored, then at most one history root hash is stored for every blockchain block. Thus if for example a blockchain block is added every 12 seconds, then setting $x=2^8=256$ guarantees that each history root hash is stored for at least 256*12 seconds=51 minutes. Furthermore, note that 256 is the highest number that fits in one byte, which can be an advantage in implementations. This number can however be adjusted, e.g., according to the time needed for the proving.

In some embodiments each user transfer instruction may contain instructions for at least one transfer of funds between two different ZK-rollup addresses or from a ZK-rollup address to a blockchain address.

Note that a single transfer of funds is always between two distinct addresses, and that in the case of the receiving address being a blockchain address, the latter is represented in an appropriate way within the rollup structure. A user transfer instruction can however contain several transfers from a ZK-rollup address to other ZK-rollup addresses and/or to blockchain addresses. It typically contains transfers from only one ZK-rollup address. A user can however have more than one user ZK-rollup accounts registered.

In some embodiments the blockchain may be an Ethereum blockchain.

In some embodiments the funds may be assets of the type of cryptocurrency and/or of digital tokens.

The invention also refers to a computer program product which executes the transaction method described above when it runs on a computer device network.

BRIEF EXPLANATION OF THE FIGURES

The invention is further described below with reference to figures. The figures show:

FIG. 1—a schematic representation of a ZK-rollup chain;

FIG. 2—a schematic representation of adding a batch to a ZK-rollup;

FIG. 3—example of a registration batch;

FIG. 4—example of a deposit batch;

FIG. 6—a schematic representation of a validated chain;

FIG. 7—a schematic representation of adding a valid registration batch;

FIG. 8—a schematic representation of adding a valid deposit or transfer batch;

FIG. 9—a schematic representation of adding an invalid batch;

IMPLEMENTATIONS OF THE INVENTION

Figure 5A:
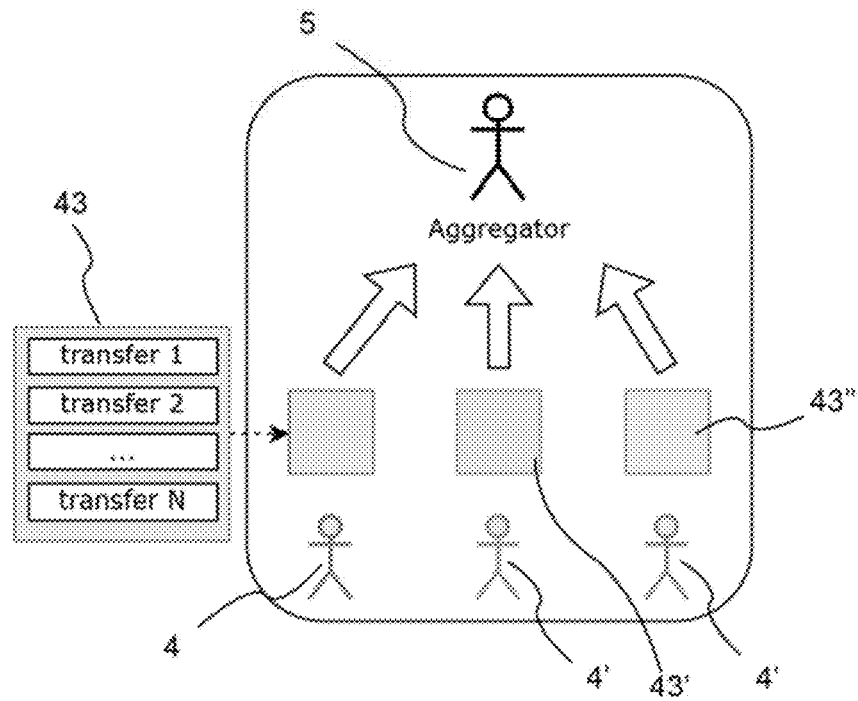
FIGS. 5A-5D—a schematic representation of a transfer transaction method for a ZK-rollup network.

In the present section, as well as in the figures, for the sake of ease of reading a ZK-rollup block is called a batch and a blockchain block is called a block.

A ZK-rollup chain consists here of a chain of batches together with their batch hashes 31 (history root hashes), as seen in FIG. 1. There are three kinds of batches, registration batches 6 (user registration transactions), deposit batches 7 (user token deposit transactions) and transfer batches 51 (aggregator transfer transactions). These will be explained later. Each batch hash 31 is a hash of the batch content together with the previous batch hash 31' (immediately preceding history root hash).

The ZK-rollup smart contract is here a blockchain (also referred to as layer one or L1, whereas a ZK-rollup is also referred to as layer two or L2) smart contract which stores a list of the last 256 batch hashes 31, which is needed for withdrawals as explained later. The process of adding a batch to the ZK-rollup is shown in FIG. 2.

Anyone participating in the ZK-rollup can add a new batch 6, 7, 51 to the ZK-rollup by making a blockchain transaction to the ZK-rollup smart contract 3 with the content of the new block 6, 7, 51 included as calldata, or blob-data. The ZK-rollup smart contract 3 will then compute the batch hash 31 of the new batch by hashing its content together with the previous batch hash 31', which is already stored in the contract storage 32 (ZK-rollup contract state). The ZK-rollup smart contract 3 then adds the new batch hash 31 (N) to the list of recent batch hashes 31' (N−1, . . . , N−255) and removes the oldest batch hash from the list.

An aggregator 5 does not need to know the previous batch in order to add a new batch to the ZK-rollup. This means that aggregating can be fully permissionless, so that new batches can be added concurrently by anyone.

Before a user can make a transaction on the ZK-rollup network, he may register a user ZK-rollup account by registering a public Boneh-Lynn-Shacham (BLS) key. This can be done by adding a registration batch 6 to the ZK-rollup. A registration batch 6 comprises at least the public BLS key and a signature of the BLS key by the corresponding private key (FIG. 3). The signature proves that each user knows the private key corresponding to their public BLS key, preventing a rogue key attack. When a user registers a new account, the account is given an account ID (e.g., L2 address), which may be an integer that increments for each new account.

In order to deposit tokens to the ZK-rollup, a user must create a deposit batch 7 (user token deposit transaction) and send it to the ZK-rollup smart contract 3 together with the amount of tokens specified in the deposit batch 7. The deposit batch 7 at least specifies the account ID (L2 address) that will receive the tokens, the token IDs (i.e., the kinds of tokens to be deposited), and the amount of tokens of each kind (i.e., corresponding to each of the specified token IDs) (FIG. 4). The ZK-rollup smart contract 3 then verifies that it received the correct amount of tokens in the same transaction, and adds the deposit batch 7 to the ZK-rollup. The receiving L2 address can be owned by the user initiating the deposit, or by another user.

FIG. 5A to 5D illustrate how users via a user ZK-rollup nodes 4, 4', 4" can initiate transfers of tokens between each other. Transfers between users are aggregated into a transfer batch (aggregator transfer transaction) 51 by an aggregator via an aggregator ZK-rollup node 5, which is then added to the ZK-rollup.

A user is understood here as a user operator having access to a user ZK-rollup node 4 on a computer device. The user operator can be one or more natural persons or a software. An aggregator is understood here as an aggregator operator having access to an aggregator ZK-rollup node 5 on a computer device. The aggregator operator can be one or more natural persons or a software.

Figure 5B:
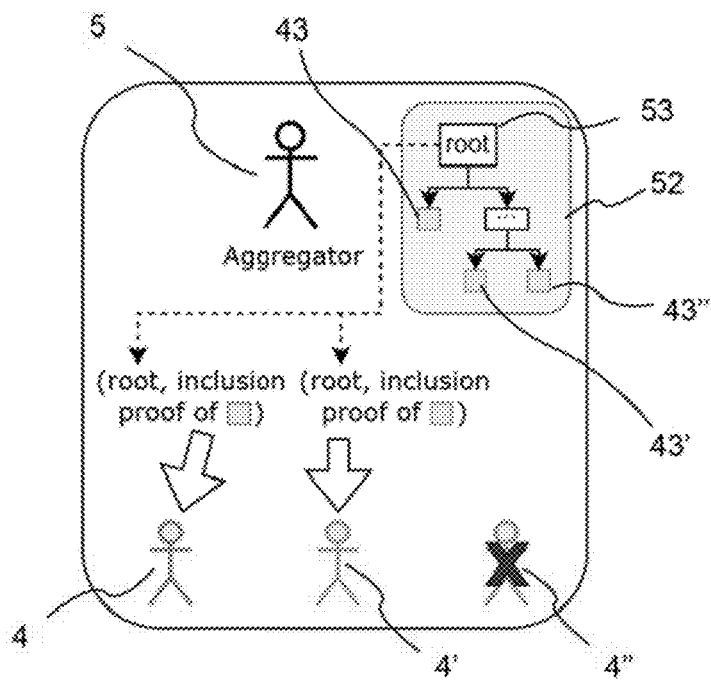
Figure 5C:
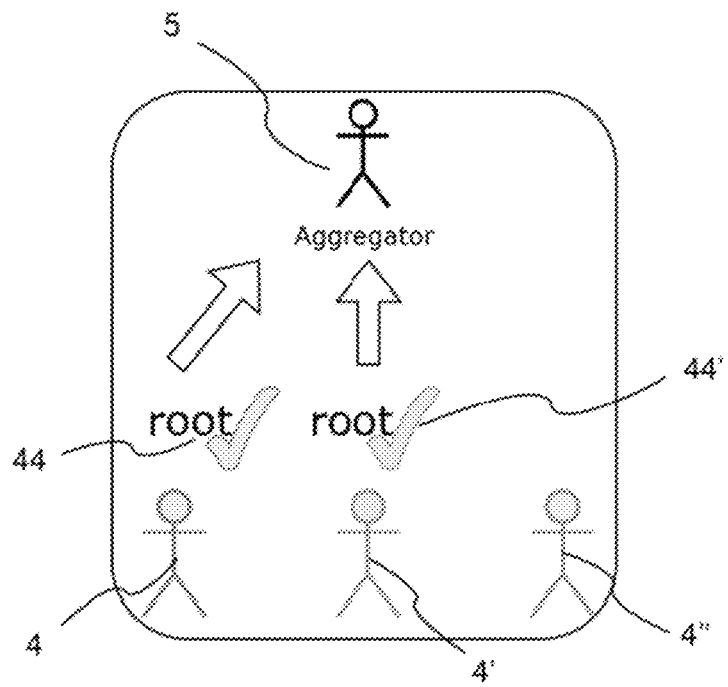
Figure 5D:
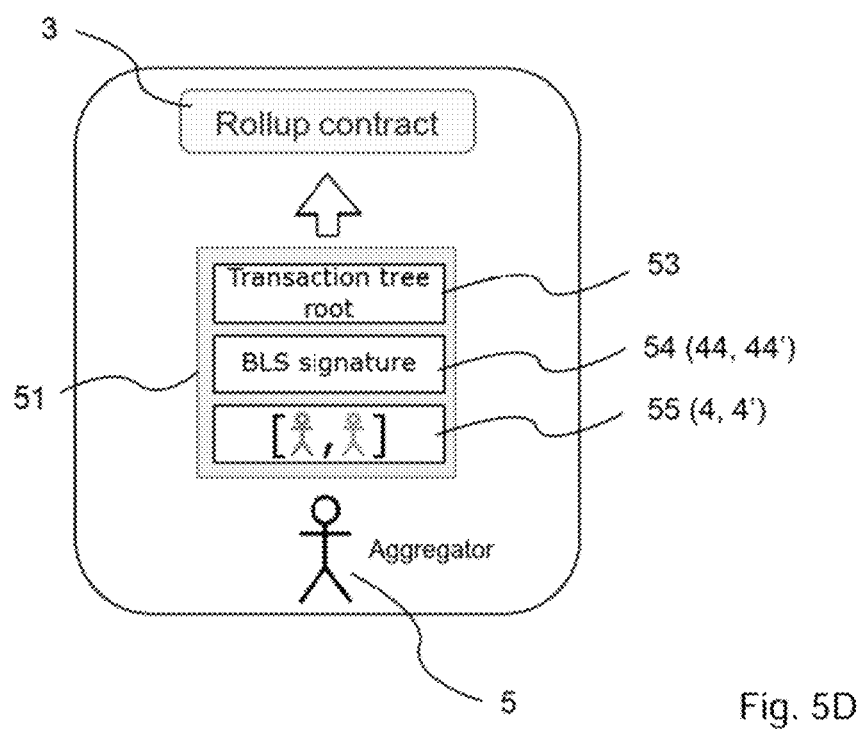

A user who wishes to send tokens to another user can create a transaction consisting of one or more transfers (user transfer instruction 43, 43', 43") and send it to an aggregator 5 (FIG. 5A). The aggregator 5 receives the user transactions 43, 43', 43" and makes a Merkle tree 52 of the transactions and sends to each user 4, 4', 4" the Merkle root 53 and a Merkle proof of his transaction (i.e., a proof that his transaction is included in the Merkle tree) (FIG. 5B). In FIG. 5B, the third user 4" is offline and does not receive the Merkle root and his Merkle proof. The users 4, 4' that received their inclusion proof from the aggregator 5 sign the transaction tree root (i.e., the Merkle root) using their BLS signature and send the signature 44, 44' back to the aggregator 5 (FIG. 5C). The aggregator 5 sends to the ZK-rollup smart contract 3 (rollup contract) a transfer batch 51 (aggregator transfer transaction; cf. FIG. 2 for adding a batch to the ZK-rollup), which consists of the transaction tree (Merkle) root 53, the BLS aggregated signature 54 (aggregated from the user signatures 44, 44'), and the list of users 55 that are included in the BLS (aggregated) signature 54 (FIG. 5D).

Because each sender has received an inclusion proof of his transaction in the transfer batch 51, there is no need to publish the transactions themselves on-chain, just the transaction tree (Merkle) root. This makes the ZK-rollup according to the invention more data-efficient than other rollups which publishes all transaction data on-chain.

When the ZK-rollup smart contract 3 receives a new batch 6, 7, 51, it verifies that the batch 6, 7, 51 has the correct format, but it does not verify the validity of its content, i.e. that the BLS aggregated signature 54 of a transfer batch 51 is correct or that the signature of a registration batch 6 is correct. This means that the ZK-rollup can contain both valid and invalid batches. In detail, a transfer batch 51 is valid if its BLS aggregated signature 54 of its transfer tree (Merkle) root 53 by the specified list of users 55 is correct. Otherwise, the transfer block 51 is invalid. A registration batch 6 is valid if the provided signature is a correct signature of the provided public key by the corresponding private key. Every deposit batch 7 in the ZK-rollup is valid, since their validity is checked by the ZK-rollup smart contract when they are added.

Instead of verifying each new ZK-rollup batch when it is added by the ZK-rollup smart contract, a derived chain of ZK-rollup batches is computed off-chain, by only including the valid batches from the original ZK-rollup chain (FIG. 6). This chain is called the validated chain.

Computing the validated chain: The original batch hashes 31, 31' are denoted by Bi' and the validated batch hashes are denoted by Bi. In the case shown in FIG. 6, the first and third batch (from left to right in FIG. 6) are valid, while the second batch is invalid. The original batch hashes 31 are computed by taking the hash of the previous original batch hash 31 and the content of the current batch, including both the valid and the invalid batches. These hashes 31, 31' are the ones that are stored in the ZK-rollup smart contract 3 on-chain. The validated batch hashes, on the other hand, are computed in the same way as the original batch hashes 31, 31', except that here only the valid batches are included, and all invalid batches are skipped.

In order to check the validity of a transfer batch 51, the public keys corresponding to the L2 addresses are tracked. In detail, a root of a user L2 address (Merkle) tree (denoted Ui) and the validated batch hash (denoted Bi) are computed and maintained off-chain.

If a registration batch 6 is valid, the new public key is added to the (Merkle) tree of L2 addresses (FIG. 7).

When a valid deposit batch 7 or a valid transfer batch 51 is added, it is hashed together with the previous validated batch hash, forming the new validated batch hash (FIG. 8).

When an invalid batch is added (invalid transfer batch 51 or invalid registration batch 6), Merkle tree of L2 addresses and the validated batch hash are unchanged. (FIG. 9)

Figure 10:
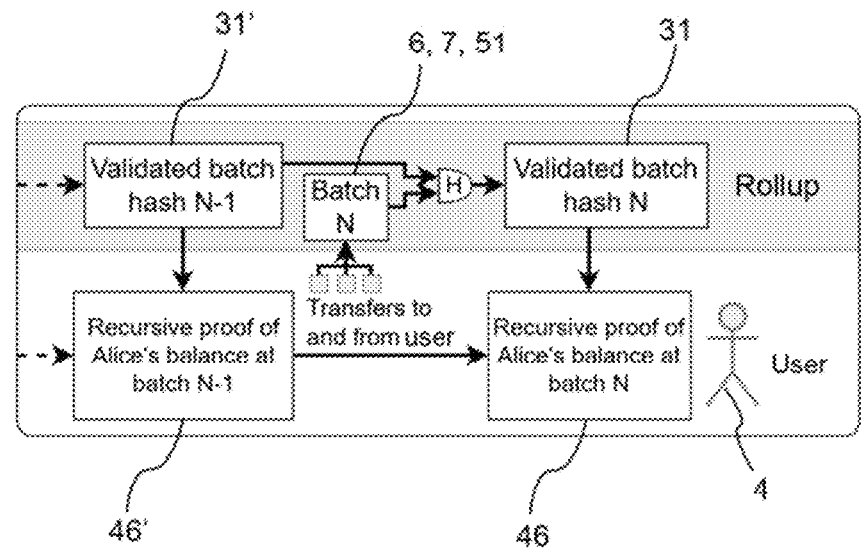
FIG. 10—a schematic representation of updating a user state/balance.

When adding new batches 6, 7, 51 to the ZK-rollup, nothing gets validated on-chain, except for computing the new history root hash 31, 31'. Instead, every user 4 (exemplarily also named Alice in FIG. 10) keeps track of his own balance, and computes a user recursive ZK-proof 46, 46' that his balance is correct at a certain history root hash 31, 31'. When the user sends or receives funds, the balance is updated and a new recursive ZK-proof 46 is generated, replacing the old one 46' (FIG. 10).

For each new batch 6, 7, 51 that is added to the ZK-rollup, each user will update his balance and compute a new recursive ZK-proof 46 of the updated balance. In detail, let Bi be the i-th batch hash 31 and let xi be the user's balance at Bi. Then a proof that the user's balance at BN is a certain value xN proves the following:
1. There exists a value x' and a recursive ZK-proof that x'=xN−1.
2. The value x is obtained from x' by subtracting all transfers from the user in batch N and adding a set of transfers to the user in batch N.
3. There exist recursive ZK-proofs that each transfer to the user in batch N used in the above computation is valid, i.e., that the balance of each sender is non-negative after the transfer.

Both L2 (ZK-rollup) and L1 (blockchain) addresses can be recipients of transfers in a transfer batch 51. Transfers to blockchain (L1) addresses are however not processed by the ZK-rollup smart contract 3 when the corresponding transfer batch 51 is added. Instead, a withdraw function is implemented to the ZK-rollup smart contract 3, which can be used by anyone to process the transfers. In addition, the ZK-rollup smart contract 3 will store a list of how much has already been withdrawn to each blockchain (L1) address.

Figure 11:
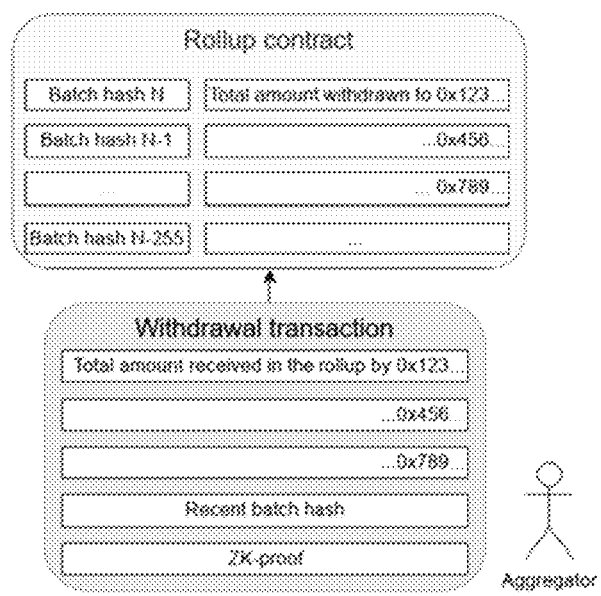
FIG. 11—a schematic representation of a withdrawal.

The withdrawal function can be called by anyone participating in the ZK-rollup and takes as input a list of blockchain (L1) addresses, the amount that each blockchain (L1) address has received in the ZK-rollup, a recent original batch hash Bi' 31 and a ZK-proof that the blockchain (L1) address has received the claimed amounts at Bi' 31 (FIG. 11).

The ZK-proof takes as public input the recent batch hash Bi' 31, the list of blockchain (L1) addresses and the corresponding list of amounts, and proves the following:
1. There exists a purported validated batch hash Bi and a ZK-proof that this is the correct validated batch hash corresponding to Bi' 31.
2. For each blockchain (L1) address in the list, there exists a ZK-proof that the blockchain (L1) address has received the specified amount at validated batch hash Bi.

The withdrawal function will verify the proof, check that the provided original batch hash Bi' 31 is in the list of recent batch hashes, and transfer to each blockchain address the amount given by taking the claimed received amount and subtracting the previously withdrawn amount which is stored in the contract storage 32 (ZK-rollup contract state).

To summarize, the process of withdrawing funds to a blockchain (L1) account consists of two steps. The first step is to transfer the funds to the blockchain (L1) address in a transfer batch 51. The second step is to call the withdrawal function in the ZK-rollup smart contract 3, which will perform the withdrawing.

REFERENCE SIGNS

3 ZK-rollup smart contract
31, 31' history root hash/batch hash
32 ZK-rollup contract state/storage
4, 4', 4" user ZK-rollup node, user
43, 43', 43" user transfer instruction
44, 44' user signature
46 balance recursive ZK-proof
5 aggregator ZK-rollup node, aggregator
51, 51' aggregator transfer transaction/transfer batch
52 Merkle tree of user transfer transactions
53 Merkle root of user transfer transactions
54 aggregated signature
55 list of user ZK-rollup accounts
6 user registration transaction/registration batch
7 user token deposit transaction/deposit batch

The invention claimed is:
1. A transaction method for a ZK-rollup network for a blockchain, with transaction rules governed by a ZK-rollup smart contract deployed on the blockchain, and with the ZK-rollup network comprising several user ZK-rollup nodes of which at least one is an aggregator ZK-rollup node, comprising the following steps: by means of the ZK-rollup smart contract
  processing a user transfer by
    receiving an aggregator transfer transaction from an aggregator ZK-rollup node A of the at least one aggregator ZK-rollup node, with the aggregator transfer transaction being generated at the aggregator ZK-rollup node A and comprising
      i. a Merkle root of a Merkle tree of at least one user transfer instruction, with each of the at least one user transfer instruction being generated at one of the several user ZK-rollup nodes and transferred to the aggregator ZK-rollup node A,
      ii. an aggregated signature built from at least one user signature of the Merkle root, with each of the at least one user signature of the Merkle root corresponding to a user ZK-rollup account and being transferred to the aggregator ZK-rollup node A from one of the several user ZK-rollup nodes after the ZK-rollup nodes has received the Merkle root together with a proof of inclusion of the user transfer instruction generated at this user ZK-rollup node from the aggregator ZK-rollup node A, and
      iii. a list of every user ZK-rollup account corresponding to any of the at least one user signature of the Merkle root from which the aggregated signature is built;
    verifying that the aggregator transfer transaction is formally valid; and
    if the verification in the previous step was successful, without further verification of the aggregator transfer transaction, computing a history root hash from content of the aggregator transfer transaction and from an immediately preceding history root hash, and storing the computed history root hash in a ZK-rollup contract state until a predefined condition is met;
  and processing a withdrawal of funds to one or more blockchain addresses by
    receiving an aggregator withdrawal transaction from an aggregator ZK-rollup node B of the at least one aggregator ZK-rollup node, with the aggregator withdrawal transaction being generated at the aggregator ZK-rollup node B and comprising
      i. the one or more blockchain addresses,
      ii. a history root hash M,
      iii. a purported total amount received by each of the one or more blockchain addresses at history root hash M,
      iv. one or more recursive ZK-proofs of correctness of each purported total amount received;
    verifying
      i. that the aggregator withdrawal transaction is formally valid,
      ii. that the history root hash M is stored in the ZK-rollup contract state, and iii. each of the one or more recursive ZK-proofs of the correctness of each purported total amount received;

if the verifications in the verifying step were successful,
i. transferring funds according to the purported total amount received by each of the one or more blockchain addresses at history root hash M and according to total amounts already withdrawn to each of the one or more blockchain addresses,
ii. updating a list of total amounts already withdrawn to each of the one or more blockchain addresses according to the amounts processed for each of the one or more blockchain addresses in step i., wherein the list of total amounts withdrawn to each of the one or more blockchain addresses is stored in the ZK-rollup contract state.

2. The transaction method according to claim 1, wherein the method comprises the following additional step: by means of the ZK-rollup smart contract:
processing a registration of a user ZK-rollup account by
receiving a user registration transaction from one of the several user ZK-rollup nodes, with the user registration transaction comprising a user identifier of the user ZK-rollup account and a user signature of the user identifier,
verifying the user signature of the user identifier, and
if the verification in the previous step was successful,
i. computing a history root hash from content of the user registration transaction and the immediately preceding history root hash, and storing the computed history root hash in the ZK-rollup contract state until the predefined condition is met, and
ii. assigning a ZK-rollup address to the user ZK-rollup account.

3. The transaction method according to claim 2, wherein the user signatures and/or aggregated signatures are BLS signatures.

4. The transaction method according to claim 1, wherein the method comprises the following additional step: by means of the ZK-rollup smart contract:
processing a user token deposit by
receiving a set of tokens together with a user token deposit transaction from one of the several user ZK-rollup nodes, with the user token deposit transaction being generated at this user ZK-rollup node and comprising
i. at least one token ID,
ii. an amount of tokens for each of the at least one token IDs, and
iii. a ZK-rollup address to receive the amounts of tokens;
verifying that
i. the user token deposit transaction is formally valid, and
ii. for each of the at least one token IDs, the set of tokens received comprises as many tokens corresponding to this token ID as indicated by the amount of tokens for this token ID;
if the verifications in the previous step were successful,
i. computing a history root hash from content of the user token deposit transaction and the immediately preceding history root hash, and storing the computed history root hash in the ZK-rollup contract state until the predefined condition is met.

5. The transaction method according to claim 1, wherein the predefined condition is either that a fixed number x of succeeding history root hashes is stored, or the predefined condition is that another history root hash corresponding to the same blockchain block and/or a fixed number x of succeeding history root hashes is stored.

6. The transaction method according to claim 5, wherein the fixed number x is a natural number between 1 and $2^{16}$.

7. The transaction method according to claim 6, wherein $2^7 \leq x \leq 2^9$.

8. The transaction method according to claim 7, wherein $x = 2^8$.

9. The transaction method according to claim 1, wherein each user transfer instruction contains instructions for at least one transfer of funds between two different ZK-rollup addresses or from a ZK-rollup address to a blockchain address.

10. The transaction method according to claim 1, wherein the blockchain is an Ethereum blockchain.

11. The transaction method according to claim 1, wherein the funds are one of a type of cryptocurrency, digital tokens, or a combination thereof.

12. A computer program product for a ZK-rollup network for a blockchain, with transaction rules governed by a ZK-rollup smart contract deployed on the blockchain, and with the ZK-rollup network comprising several user ZK-rollup nodes of which at least one is an aggregator ZK-rollup node, comprising a non-transitory computer readable storage medium having a computer readable program stored therein, wherein the computer readable program, when executed on a computing device, causes the computing device to perform the following steps: by means of the ZK-rollup smart contract by
receiving an aggregator transfer transaction from an aggregator ZK-rollup node A of the at least one aggregator ZK-rollup node, with the aggregator transfer transaction being generated at the aggregator ZK-rollup node A and comprising
i. a Merkle root of a Merkle tree of at least one user transfer instruction, with each of the at least one user transfer instruction being generated at one of the several user ZK-rollup nodes and transferred to the aggregator ZK-rollup node A,
ii. an aggregated signature built from at least one user signature of the Merkle root, with each of the at least one user signature of the Merkle root corresponding to a user ZK-rollup account and being transferred to the aggregator ZK-rollup node A from one of the several user ZK-rollup nodes after the ZK-rollup nodes has received the Merkle root together with a proof of inclusion of the user transfer instruction generated at this user ZK-rollup node from the aggregator ZK-rollup node A, and
iii. a list of every user ZK-rollup account corresponding to any of the at least one user signature of the Merkle root from which the aggregated signature is built;
verifying that the aggregator transfer transaction is formally valid; and
if the verification in the previous step was successful, without further verification of the aggregator transfer transaction, computing a history root hash from content of the aggregator transfer transaction and from an immediately preceding history root hash, and storing the computed history root hash in a ZK-rollup contract state until a predefined condition is met;
and processing a withdrawal of funds to one or more blockchain addresses by receiving an aggregator withdrawal transaction from an aggregator ZK-rollup node B of the at least one aggregator ZK-rollup node, with the aggregator withdrawal transaction being generated at the aggregator ZK-rollup node B and comprising
  i. the one or more blockchain addresses,
  ii. a history root hash M,
  iii. a purported total amount received by each of the one or more blockchain addresses at history root hash M,
  iv. one or more recursive ZK-proofs of correctness of each purported total amount received;
verifying
  i. that the aggregator withdrawal transaction is formally valid,
  ii. that the history root hash M is stored in the ZK-rollup contract state, and
  iii. each of the one or more recursive ZK-proofs of the correctness of each purported total amount received;
if the verifications in the verifying step were successful,
  i. transferring funds according to the purported total amount received by each of the one or more blockchain addresses at history root hash M and according to total amounts already withdrawn to each of the one or more blockchain addresses,
  ii. updating a list of total amounts already withdrawn to each of the one or more blockchain addresses according to the amounts processed for each of the one or more blockchain addresses in step i., wherein the list of total amounts withdrawn to each of the one or more blockchain addresses is stored in the ZK-rollup contract state.

13. The computer program product according to claim 12, wherein the method comprises the following additional step: by means of the ZK-rollup smart contract:
processing a registration of a user ZK-rollup account by
  receiving a user registration transaction from one of the several user ZK-rollup nodes, with the user registration transaction comprising a user identifier of the user ZK-rollup account and a user signature of the user identifier,
  verifying the user signature of the user identifier, and
  if the verification in the previous step was successful,
    iii. computing a history root hash from content of the user registration transaction and the immediately preceding history root hash, and storing the computed history root hash in the ZK-rollup contract state until the predefined condition is met, and
    iv. assigning a ZK-rollup address to the user ZK-rollup account.

14. The computer program product according to claim 13, wherein the user signatures and/or aggregated signatures are BLS signatures.

15. The computer program product according to claim 12, wherein the method comprises the following additional step: by means of the ZK-rollup smart contract:
processing a user token deposit by
  receiving a set of tokens together with a user token deposit transaction from one of the several user ZK-rollup nodes, with the user token deposit transaction being generated at this user ZK-rollup node and comprising
    iv. at least one token ID,
    v. an amount of tokens for each of the at least one token IDs, and
    vi. a ZK-rollup address to receive the amounts of tokens;
  verifying that
    iii. the user token deposit transaction is formally valid, and
    iv. for each of the at least one token IDs, the set of tokens received comprises as many tokens corresponding to this token ID as indicated by the amount of tokens for this token ID;
  if the verifications in the previous step were successful,
    ii. computing a history root hash from content of the user token deposit transaction and the immediately preceding history root hash, and storing the computed history root hash in the ZK-rollup contract state until the predefined condition is met.

16. The computer program product according to claim 12, wherein the predefined condition is either that a fixed number x of succeeding history root hashes is stored, or the predefined condition is that another history root hash corresponding to the same blockchain block and/or a fixed number x of succeeding history root hashes is stored.

17. The computer program product according to claim 16, wherein the fixed number x is a natural number between 1 and $2^{16}$.

18. The computer program product according to claim 17, wherein $2^7 \leq x \leq 2^9$.

19. The computer program product according to claim 7, wherein $x=2^8$.

20. The computer program product according to claim 12, wherein each user transfer instruction contains instructions for at least one transfer of funds between two different ZK-rollup addresses or from a ZK-rollup address to a blockchain address.

* * * * *